US006451361B1

(12) United States Patent
Moore

(10) Patent No.: US 6,451,361 B1
(45) Date of Patent: Sep. 17, 2002

(54) ALKALI METAL MAGNESIUM PHOSPHATE HYDRATE BUFFERING FEED MINERAL

(75) Inventor: William P. Moore, Hopewell, VA (US)

(73) Assignee: Agri-Nutrients Technology Group, Inc., Disputanta, VA (US)

( * ) Notice: Subject to any disclaimer, the term of this patent is extended or adjusted under 35 U.S.C. 154(b) by 0 days.

(21) Appl. No.: 09/865,865

(22) Filed: May 29, 2001

(51) Int. Cl.[7] ............................................... A23L 1/304

(52) U.S. Cl. ......................................... 426/74; 426/807

(58) Field of Search .................................. 426/807, 74

(56) References Cited

U.S. PATENT DOCUMENTS 5,374,294 A  * 12/1994  Moore ........................... 71/33

* cited by examiner

Primary Examiner—Helen Pratt

(57) ABSTRACT

A bioavailable water soluble animal feed mineral composition which provides buffering of animal digestive fluids to near-neutral pH comprising an alkali metal magnesium phosphate hydrate providing a total of between 1.5 and 4.7 equivalent weights of alkali metal and magnesium per molecule of phosphorus. Water of hydration amounting to between 6 and 12 percent is required for effectiveness. An effective composition, $Na_2Mg(PO4)\,0.8\,H_2O$, is prepared by stepwise reaction of sodium carbonate and magnesium oxide with orthophosphoric acid in a rotating pan equipped for high intensity mixing.

14 Claims, No Drawings

ALKALI METAL MAGNESIUM PHOSPHATE HYDRATE BUFFERING FEED MINERAL

BACKGROUND OF THE INVENTION

1. Field of the Invention

The present invention relates to inorganic minerals useful for animal nutrition. More particularly, it relates to a new water soluble bioavailable feed mineral composition of alkali metal magnesium phosphate hydrate which provides effective buffering in the digestive fluids of animals. The new composition may be represented by the empirical formula $L_xMg_yH_z(PO_4) \cdot W\ H_2O$ wherein L represents an alkali metal, X represents numbers between 0.50 and 3.7, Y is between 0.50 and 1.50, Z is between 0.00 and 1.50, and W represents numbers between 0.60 and 1.50. An effective method for preparing the new composition is provided.

2. Description of Related Art

The elements phosphorus, magnesium, and alkali metals are all essential parts of the mineral requirements of animals. These elements are frequently supplied in feed rations in the form of a mineral mixture containing dicalcium phosphate and sodium chloride. The dicalcium phosphate sometimes provides more calcium than is desirable in some feed rations and a non-calcium phosphorus source is needed. Monosodium phosphate is used in some rations to supply phosphorus without calcium, but undesirably exhibits an acid pH.

Animals feeding on high energy rations need buffering to maintain pH in their digestive fluids in an optimum range between 6 and 7. A common buffering practice is to add sodium bicarbonate exhibiting a pH of between 8.5 to 9.5 to buffer the pH of these fluids to the desired area. Sodium bicarbonate contributes only sodium as a nutrient and becomes spent if applied to damp rations such as silage.

Phosphorous, magnesium, and alkali metal ions are supplied as feed mineral concentrates for animals in several different ways. For example, in U.S. Pat. No. 4,027,043 and 4,431,675 J. J. Schroeder et al disclose a solid animal feed supplement comprising a small amount of soluble phosphate, an oxide of a metal consisting of aluminum, magnesium, or calcium with molasses and fat to form a solid block in which a substantial amount of protein equivalent, such as urea, is combined. The mineral blocks thus formed exhibit acid pH's which provide little or no buffering in the desired fluid pH range for animals. The blocks also contain little or no soluble magnesium.

In my U.S. Pat. No. 5,613,465 and 5,374,294 the preparation of controlled release fertilizers with very low water solubilities by combining alkali metal ions, phosphoric acid and divalent metal oxides, particularly magnesium oxide, is disclosed.

Soluble phosphates provided as monosodium phosphate usually contain 20 to 30 percent pyrophosphate, which must be slowly dissolved and hydrolyzed to allow assimilation as orthophosphate. The acidity of the monosodium phosphate provides no buffering of rumen fluids in the desired pH range.

Heretofore, workers in the art have not been able to combine alkali metals such as sodium with magnesium and phosphorus to form a bioavailable water soluble composition which functions as an effective buffer for digestive fluids of animals in the optimum pH range. Such a composition is to be highly desired, because it would allow an economically small amount of mineral to be admixed in the feed ration to safely buffer digestive fluids in the optimum pH range while effectively providing the required magnesium and phosphorus moieties of the feed rations in highly available form.

OBJECTS OF THE INVENTION

It is a primary object of this invention to provide a feed mineral composition to provide magnesium, phosphorus, and alkali metal elements for animals in bioavailable form.

It is another primary object of this invention to provide a feed mineral composition which will provide buffering of digestive fluids of animals to about an optimum pH for feed utilization.

It is another object of this invention to provide a bioavailable buffering feed mineral composition prepared in a simple method from commodity chemicals.

BRIEF SUMMARY OF THE INVENTION

I have discovered a new water soluble animal feed mineral composition which provides highly bioavailable phosphorus, magnesium, and alkali metals, such as sodium and potassium, while buffering the digestive fluids of animals to near neutral pH with a wide margin of safety. The new composition is an alkali metal magnesium phosphate hydrate which provides a total of between 1.50 and 4.70 equivalent weights of alkali metal and magnesium per molecule of phosphorus and may be represented by the empirical formula $L_xMg_yH_z(PO_4) \cdot W\ H_2O$ wherein L represents an alkali metal, X represents numbers between 0.50 and 3.7, Y represents numbers between 0.50 and 1.50, Z represents numbers between 0.00 and 1.50, and W represents numbers between 0.60 and 1.50.

The new composition, providing safe buffering of digestive fluids and high bioavailability of phosphorus, magnesium, and alkali metal, may be effectively prepared from commodity chemicals. The preparation comprises reacting alkali metal bases and strong aqueous phosphoric acid, and then reacting the alkali metal phosphate formed with magnesium oxide powder to produce alkali metal magnesium phosphate hydrate. To preserve the composition's water solubility, the hydrate product is dried only until the water amounts to between 0.6 and 1.50 mols in the alkali metal magnesium phosphate hydrate empirical formula.

DETAILED DESCRIPTION OF THE INVENTION

The instant invention is a bioavailable water soluble animal feed mineral composition which comprises an alkali metal magnesium phosphate hydrate providing a total of between 1.50 and 4.70 equivalent weights of alkali metal and magnesium per molecule of phosphorus which may be represented by the empirical formula $L_xMg_yH_z(PO_4) \cdot W\ H_2O$ wherein L represents an alkali metal moiety, X represents numbers between 0.50 and 3.7, Y represents numbers between 0.50 and 1.50, Z represents numbers between 0.00 and 1.50, and W represents numbers between 0.60 and 1.50, the composition providing buffering of digestive fluids of ruminant and monogastric animals to near neutral pH's.

The presence of an alkali metal, usually sodium or potassium, in amounts between 0.50 and 3.70 molecules per empirical formula provides high bioavailability for the composition. Smaller amounts drastically reduce the water solubility and the magnesium and phosphorous bioavailability, and larger amounts increase hygroscopicity of the composition causing poor storage stability.

The retention of hydrogen in the composition is usually not desirable for maximum buffer capacity but up to 1.50 molecules may be retained to buffer at low pH's and still retain high bioavailability. More than 1.50 molecules of hydrogen provides unsatisfactory buffering in the digestive fluids.

A key to water solubility and bioavailability is the water of hydration in the instant composition. Water solubility and bioavailability of magnesium and phosphorus decrease sharply as the water of hydration is decreased to less than 0.60 molecule per empirical formula and the storage stability decreases sharply as water of hydration is increased to more than 1.50 molecules per empirical formula.

The molecular weight of the alkali metal, sodium or potassium for example, included in the animal feed mineral formula has an effect on its weight percent content, but the composition is effective with the alkali metal amounting to between 8 and 39 percent, the magnesium amounting to between 7 and 19 percent, the phosphorous amounting to between 13 and 20 and the water amounting to between 6 and 12 percent of the composition.

The composition is effective where the phosphorus is derived from economical wet process orthophosphoric acid. For safe effective use as an animal feed mineral, it is necessary that the orthophosphoric acid contain less than 1 part of fluoride per 100 parts of phosphorus. Furnace grade orthophosphoric acid may also be effectively used but it is economically less desirable. The use of pyrophosphoric acid is not effective because the compositions formed are very difficult to recover in dry granular form and must be hydrolyzed back to orthophosphates before they may be utilized.

The instant feed mineral compositions are effective when the alkali metal is derived from alkali metal bases such as sodium carbonate or potassium hydroxide and when the magnesium is derived from magnesium bases such as magnesium oxide or magnesium hydroxide.

The composition is particularly effective and economical where the alkali metal is sodium. The efficacy is especially high where the alkali metal is derived from sodium carbonate and the magnesium is derived from magnesium oxide.

Materials frequently used in the art to buffer digestive fluids are sodium bicarbonate and magnesium oxide. These commercial compounds exhibit high pH's in water, and if ingested in excess can quickly cause undesirable alkaline conditions in the digestive fluids. Over-treatment with buffer may be caused by errors in estimates of animal size, and the composition of the digestive fluid and by errors in measuring the amounts of the buffering material. The instant composition exhibits a pH of between 6.6 and 10.0 when diluted to a 5 percent distilled water solution; however, it slowly buffers acid pH in digestive fluids without the quick high pH reaction possible with buffers such as sodium carbonate, magnesium oxide and sodium bicarbonate.

Best properties of bioavailability, buffering of digestive fluids, and storage stability are obtained with the preferred composition which is represented by the empirical formula $L_xMg_yH_z(PO_4) \cdot W\ H_2O$ wherein L represents an alkali metal, X represents numbers between 0.90 and 3.07, Y represents numbers between 0.50 and 1.50, Z represents numbers between 0.00 and 0.30, and W represents numbers between 0.60 and 0.80.

The alkali metal magnesium phosphate hydrate preferably provides a total of between 2.7 and 4.7 equivalent weights of alkali metal and magnesium per molecule of phosphorus in the instant composition to obtain excellent buffering of animal digestive fluids.

The effective instant composition may be prepared by a method comprising admixing particulate alkali metal base with aqueous wet process orthophosphoric acid containing between 50 and 60 percent phosphorus, expressed as $P_2O_5$. The admixing is continued until the alkali metal base and the orthophosphoric acid react to form aqueous alkali metal orthophosphate. An amount of magnesium oxide powder containing between 54 and 60 percent magnesium is admixed and reacted with the aqueous alkali metal orthophosphate so that a total of between 3.0 and 4.0 equivalent weights of alkali metal and magnesium are combined with each molecule of phosphorus.

The mixing is continued until homogeneous particles of alkali metal magnesium orthophosphate hydrate are formed. Then, the particles are dried by ordinary means until animal mineral particles are formed which exhibit an empirical formula of $L_xMg_yH_z(PO_4) \cdot W\ H_2O$ wherein L represents an alkali metal, X represents numbers between 0.90 and 3.0, Y represents numbers between 0.50 and 1.50, Z represents numbers between 0.00 and 0.30, and W represents numbers between 0.6 and 0.8.

A particularly economical storage stable bioavailable and water soluble sodium magnesium orthophosphate hydrate animal feed mineral buffering composition exhibiting an empirical formula of about $Na_2\ Mg\ H\ (PO_4) \cdot 0.8\ H_2O$ is prepared by the following stepwise method. First, sodium carbonate containing between 40 and 47 percent sodium is admixed with aqueous wet process orthophosphoric acid containing between 50 and 60 percent $P_2O_5$ at a molecular ratio of about 2.0 sodium to 1.0 phosphorus.

Admixing is continued until reaction between sodium carbonate and orthophosphoric acid is complete as indicated by termination of carbon dioxide generation, to form aqueous sodium orthophosphate. Then, admixing and reacting an amount of magnesium oxide containing between 54 and 60 percent magnesium, with the aqueous sodium orthophosphate so that the molecular ratio of sodium to phosphorus to magnesium amounts to about 2 to 1 to 1. Continuing to admix until homogeneous particles of sodium magnesium phosphate hydrate are formed, and then drying by conventional means until a particulate animal feed mineral buffering composition is formed containing about 0.8 molecule of water per empirical formula.

The utility of the animal feed mineral composition may be optimized for particular animals and for particular feeding situations by partitioning the mineral composition solids into a plurality of particle size ranges by means of a screener.

The size of the animal mineral particles may be controlled where the fine dry animal mineral particles partitioned by means of a screener and passing through a 20 Mesh U.S. Standard Screen, amounting to between 10 and 50 percent of the animal mineral particles are recycled and admixed with the sodium magnesium orthophosphate hydrate before drying to control the size of the animal mineral particles.

The instant composition may be prepared in a particularly effective manner by a method wherein the admixing and reacting to form homogeneous particles is performed in a pan rotating clockwise at a tip speed between 0.5 and 10.0 meters per second at an angle between 10 and 30 degrees from horizontal, with the pan equipped with an agitator exhibiting a diameter between 20 and 33 percent of that of the pan and operating near the wall of the pan in a counterclockwise direction at a tip speed between 2 and 5 times that of the pan.

Mode of Operation of the Invention

Having described the basic concepts of the instant invention, reference is now made to the following examples which are provided to illustrate the new composition, its efficacy and preparation.

EXAMPLE 1

This example demonstrates the criticality of the water content of the composition on the phosphorus solubility and the physical integrity of the composition particles.

| W, Wt % Water | Water Solubility of Phosphorus (by AOAC Meth. 977.01) |
|---|---|
| 0.02 | 18.0 |
| 1.00 | 37.2 |
| 6.00 | 74.8 |
| 8.00 | 82.5 |
| 12.00 | 89.5 |
| 16.00 | particles sticky and unusable |

EXAMPLE 2

This example demonstrates the bioavailability of the alkali metal magnesium phosphate hydrate composition and the effectiveness of the composition with an empirical formula of $Na_{0.7}Mg_{0.7}H_{0.9}(PO_4) \cdot 1.3\ H_2O$ in supplying phosphorus to, and providing weight gain to monogastric chicks. The tests were conducted at a University Test Facility starting with newly hatched broiler chicks. The test was carried out over a 21-day period. Weight gain was measured in each group of 10 chicks. Also measured at the end of the test were weight gain/weight of feed, weight percent ash in the tibia, and the relative bioavailability.

Measurements were made comparing the results obtained with the test material and the Standard NRC technical grade hydrous dibasic calcium phosphate. The results of the tests are tabulated as follows:

| Phosphorus in Feed, Wt % | | | Ash Content | Avg. Wt. | Wt. Gain, gms | Bioavailability, relative |
|---|---|---|---|---|---|---|
| Added P | Total P | Available P | of Tibia, Wt % | Gain, Gms | per grm feed | to NRC Standard, % |
| Standard Phosphorus Source | | | | | | |
| 0.15 | 0.69 | 0.448 | 40.5 | 639.6 | 0.688 | — |
| 0.25 | 0.72 | 0.478 | 41.5 | 664.6 | 0.725 | — |
| 0.35 | 0.88 | 0.638 | 42.5 | 667.7 | 0.722 | — |
| $Na_{.7}Mg_{.9}H_{.9}(PO_4) \cdot 1.3\ H_2O$ | | | | | | |
| 0.15 | 0.69 | 0.450 | 41.3 | 667.0 | 0.797 | 104.3 |
| 0.25 | 0.74 | 0.498 | 39.2 | 624.8 | 0.709 | 94.4 |
| 0.35 | 0.88 | 0.623 | 43.2 | 690.2 | 0.758 | 103.4 |

The tests showed that the bioavailability of the alkali metal magnesium orthophosphate hydrate was slightly more bioavailable than the NRC Standard hydrous dibasic calcium phosphate.

EXAMPLE 3

This example demonstrates the ability of the instant invention to effectively buffer acid fluids to pH areas ideal for animal digestive fluids. The example compares performance of compositions of the instant invention with sodium bicarbonate, with regard to original pH, and amount of acid buffered to pH 6. One gram of buffering agent was mixed with 100 grams water and titrated to pH 6 by 0.1N hydrochloric acid. The results are tabulated as follows:

| Compound | pH of Buffer 5% in $H_2O$ | Buffer Capacity m.eg. of HCl brought to pH per gram compound |
|---|---|---|
| $Na_{.9}Mg_{.9}H_{.3}(PO_4) \cdot 0.8\ H_2O$ | 7.0 | 8.0 |
| $Na_{.2}Mg(PO_4) \cdot 0.7\ H_2O$ | 9.4 | 10.0 |
| $Na_{2.7}Mg_{0.7}(PO_4) \cdot 0.7\ H_2O$ | 9.5 | 11.0 |
| $Na_{3.76}Mg_{0.9}(PO_4) \cdot 0.7\ H_2O$ | 9.7 | 11.7 |
| $NaHCO_3$ | 9.0 | 10.0 |

Changes in pH were about instant when acid and sodium bicarbonate were combined. The changes in pH were slower as the instant composition was combined with the aqueous acid, making drastic changes in the pH of digestive juices less likely.

EXAMPLE 4

This example demonstrates the effectiveness and safety of the use of sodium magnesium orthophosphate for buffering the rumen juices of a ruminant animal.

A ruminating steer weighing about 1100 pounds which had been fistulated so that rumen fluid samples could be withdrawn as desired for pH measurement was used in experiments in which the steer was fed a constant high energy ration typical of a finishing feedlot ration. The only change in the rations were in the types and amounts of buffering agent used. The buffering agents were blended into the feed ration prior to its use. The fistulated steer received the same buffered feed ration for three days prior to sampling the rumen fluid and determining pH. The results obtained in the tests are tabulated as follows:

| Test No. | 1 | 2 | 3 | 4 | 5 |
|---|---|---|---|---|---|
| Total Ration, lbs/day | 50 | 50 | 50 | 50 | 50 |
| Buffer Material | — | $NaHCO_3$ | $NaHCO_3$ | (1) | (1) |
| Buffer Amount, lbs/% | 0 | 0.5/1.00 | 0.8/1.60 | 0.5/1.00 | 0.8/1.60 |
| pH of Rumen Sample | 5.2 | 6.7 | 7.4 | 6.4 | 6.6 |
| P Added, lbs/day | 0 | 0 | 0 | 0.10 | 0.16 |

| Test No. | 1 | 2 | 3 | 4 | 5 |
|---|---|---|---|---|---|
| Mg Added, lbs/day | 0 | 9 | 0 | 0.08 | 0.13 |

Note: (1) = $Na_.9Mg_.9H_.3(PO_4) \cdot 0.82\ H_2O$

The pH of the rumen fluid without any buffer at 5.2 was lower than optimum. When sodium bicarbonate was added at the 0.5% level in the feed ration, pH was 6.7 and in the desired range; however, an increase in the bicarbonate to 0.8% increased pH to 7.4, higher than the optimum 6–7 pH range. The use of the sodium magnesium orthophosphate hydrate at both of those levels held the rumen pH at optimum levels of 6.4 to 6.6.

EXAMPLE 5

This example demonstrates a storage stable bioavailable sodium magnesium orthophosphate hydrate prepared by an effective stepwise method.

The preparation was made in a pan having a diameter of 1 meter rotating clockwise at a tip speed of 4 meters per second at an angle to the horizontal of 20 degrees. The pan was equipped with a heavy duty flat-bladed agitator (rotor) having a diameter of 30 centimeters operating at a tip speed of 16 meters per second in a countercurrent direction with its tip coming to within about 1 centimeter of the pan wall.

To the pan was added 10.12 kilograms of dense soda ash, containing 43 Wt % Na and 96% dry matter. To the soda ash was added 27.14 kilograms black phosphoric acid containing 24.0% phosphorus, 80.0% dry matter, and 0.13% fluoride. With the pan and rotor operating, the phosphoric acid was added at the maximum rate possible not causing excess foaming from carbon dioxide formation. As soon as the carbon dioxide formation ceased, 8.20 kilograms of fine magnesium oxide powder, containing 56.0% magnesium was added. The pan and rotor operation was continued until the reaction was completed. Recycled fines of sodium magnesium orthophosphate hydrate amounting to 18.0 kilograms from screening previous batches was then added to form damp dry granules.

The damp dry granules were passed through a rotary drum dryer and dried. The dried granules were screened with 18.0 kilograms of fines, including ground oversize granules, recovered for recycle. The on-size −8+30 U.S. Standard Mesh granules amounted to 28.6 kilograms. Analysis of the on-size particles provided the composition listed as follows:

| Component | Wt % |
|---|---|
| Sodium | 13.3 |
| Magnesium | 14.0 |
| Phosphorus | 19.9 |
| Water | 7.1 |

The empirical formula corresponding to this analysis is $Na_{0.9}Mg_{0.9}H_{0.3}\ (PO_4) \cdot 0.6\ H_2O$

I claim:

1. A bioavailable, water soluble animal feed mineral composition which provides buffering of animal digestive fluids to near-neutral pH, comprising an alkali metal magnesium phosphate hydrate providing a total of between 1.50 and 4.70 equivalent weights of alkali metal and magnesium per molecule of phosphorus, the composition represented by the empirical formula $L_xMg_yH_z\ (PO_4) \cdot W\ H_2O$ wherein L represents an alkali metal, X represents numbers between 0.50 and 3.7, Y represents numbers between 0.50 and 1.50, Z represents numbers between 0.00 and 1.50, and W represents numbers between 0.60 and 1.50.

2. The composition of claim 1 wherein the alkali metal amounts to between 8 and 39 percent, the magnesium amounts to between 7 and 19 percent, the phosphorus amounts to between 13 and 20 percent, and the water between 6 and 12 percent.

3. The composition of claim 1 wherein the phosphorus is derived from wet process orthophosphoric acid containing less than one part fluoride per 100 parts of phosphorus.

4. The composition of claim 1 wherein the alkali metal is derived from alkali metal bases and the magnesium is derived from magnesium bases.

5. The composition of claim 1 wherein the alkali metal is sodium.

6. The composition of claim 1 wherein the alkali metal is derived from sodium carbonate and the magnesium is derived from magnesium oxide.

7. The composition of claim 1 wherein the composition exhibits a pH between 6.60 and 10.00 when diluted to a 5 percent concentration in water solution.

8. The composition of claim 1 represented by the empirical formula $L_xMg_yH_z\ (PO_4) \cdot W\ H_2O$ wherein L represents an alkali metal, X represents numbers between 0.90 and 3.0, Y represents numbers between 0.50 and 1.50, Z represents numbers between 0.00 and 0.3, and W represents numbers between 0.60 and 0.8.

9. The composition of claim 1 wherein the alkali metal magnesium phosphate hydrate provides a total of between 2.70 and 4.70 equivalent weights of alkali metal and magnesium per molecule of phosphorus.

10. The composition of claim 1 prepared by a method comprising:
   (a) admixing particulate alkali metal base with aqueous wet process orthophosphoric acid containing between 50 and 60 percent $P_2O_5$ until aqueous alkali metal orthophosphate is formed;
   (b) admixing magnesium oxide powder containing between 54 and 60 percent magnesium with the aqueous alkali metal orthophosphate so that a total of between 3.0 and 4.0 equivalent weights of alkali metal and magnesium are combined with each molecule of phosphorus;
   (c) continuing to admix until homogeneous particles of alkali metal magnesium orthophosphate hydrate are formed; and
   (d) drying by ordinary means until mineral particles are formed exhibiting an empirical formula $L_xMg_yH_z\ (PO_4) \cdot W\ H_2O$ wherein L represents an alkali metal, X represents numbers between 0.90 and 3.0, Y represents numbers between 0.50 and 1.50, Z represents numbers between 0 and 0.3, and W represents numbers between 0.6 and 0.8.

11. A storage stable bioavailable water soluble sodium magnesium orthophosphate hydrate animal feed mineral buffering composition exhibiting an empirical formula of about $Na_2Mg\ (PO_4) \cdot 0.8\ H_2O$, prepared by a method comprising:
   (a) admixing sodium carbonate containing between 40 and 47 percent sodium with aqueous wet process orthophosphoric acid containing between 50 and 60 percent $P_2O_5$ at a molecular ratio of about 2 sodium per phosphorus;

(b) continuing to admix until the reaction between sodium carbonate and phosphoric acid to form aqueous sodium phosphate is complete;

(c) admixing and reacting an amount of magnesium oxide containing between 54 and 60 percent magnesium with the aqueous sodium phosphate so that the molecular ratio of sodium to magnesium to phosphorus amounts to about 2 to 1 to 1:

(d) continuing to admix until homogeneous particles of sodium magnesium phosphate hydrate are formed; and, (e) drying by conventional means until a particulate animal feed mineral buffering composition is formed containing about 0.8 molecule of water per empirical formula of the composition.

12. The composition of claim 11 wherein the animal mineral particles are partitioned into a plurality of particle size ranges by means of a screener.

13. The composition of claim 11 wherein fine dry animal mineral particles, partitioned by means of a screener and passing through a 20 Mesh U.S. Standard Screen, amounting to between 10 and 50 percent of the animal mineral particles are recycled and admixed with the homogeneous particles of sodium magnesium orthophosphate hydrate before drying to control size of the animal mineral particles.

14. The composition of claim 11 wherein the admixing and reacting to form homogeneous particles is performed in a pan rotating clockwise at a tip speed between 0.5 and 10 meters per second at an angle between 10 and 30 degrees from horizontal, the pan being equipped with an agitator exhibiting a diameter between 20 and 33 percent of that of the pan and operating near the wall of the pan in a counterclockwise direction at a tip speed between 2 and 5 times that of the pan.

* * * * *